US012681241B2

(12) United States Patent
Haase

(10) Patent No.: US 12,681,241 B2
(45) Date of Patent: Jul. 14, 2026

(54) OPTICAL CABLE ASSEMBLY WITH MISMATCHED FIBER LENGTH

(71) Applicant: 3M INNOVATIVE PROPERTIES COMPANY, St. Paul, MN (US)

(72) Inventor: Michael A. Haase, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 234 days.

(21) Appl. No.: 18/274,294

(22) PCT Filed: Jan. 19, 2022

(86) PCT No.: PCT/IB2022/050436
§ 371 (c)(1),
(2) Date: Jul. 26, 2023

(87) PCT Pub. No.: WO2022/162503
PCT Pub. Date: Aug. 4, 2022

(65) Prior Publication Data
US 2024/0094472 A1 Mar. 21, 2024

Related U.S. Application Data

(60) Provisional application No. 63/199,833, filed on Jan. 28, 2021.

(51) Int. Cl.
*G02B 6/38* (2006.01)
*G02B 6/36* (2006.01)

(52) U.S. Cl.
CPC ............. *G02B 6/383* (2013.01); *G02B 6/368* (2013.01); *G02B 6/3829* (2013.01);
(Continued)

(58) Field of Classification Search
CPC .... G02B 6/3885; G02B 6/3839; G02B 6/383; G02B 6/3887; G02B 6/32; G02B 6/3829
See application file for complete search history.

(56) References Cited

U.S. PATENT DOCUMENTS

| | | | |
|---|---|---|---|
| 2004/0071407 A1 | 4/2004 | Vergeest | |
| 2018/0275355 A1* | 9/2018 | Haase .................. | G02B 6/3839 |

FOREIGN PATENT DOCUMENTS

| | | |
|---|---|---|
| WO | 2014055226 A1 | 4/2014 |
| WO | 2015094811 A1 | 6/2015 |

(Continued)

OTHER PUBLICATIONS

International Search Report for PCT International Application No. PCT/IB2022/050436, mailed on Apr. 7, 2022, 4 pages.

*Primary Examiner* — Michelle R Connelly
(74) *Attorney, Agent, or Firm* — Jonathan L. Tolstedt

(57) ABSTRACT

An optical connector assembly includes a first optical connector and a second optical connector. The first optical connector includes a first housing, a plurality of first optical fibers, a first cable retainer and a first light coupling unit attached to the plurality of first optical fibers and separated by a first optical fiber length L1. The second optical connector includes a second housing, a plurality of second optical fibers, a second cable retainer and a second light coupling unit attached to the plurality of second optical fibers and separated by a second optical fiber length L2, different from L1. The ratio of L1/L2 is such that, when the first optical connector is mated with the second optical connector, the first light coupling unit and the second light coupling unit rotate relative to the first housing and the second housing, respectively, and mate.

2 Claims, 11 Drawing Sheets

(52) U.S. Cl.
CPC ......... *G02B 6/3839* (2013.01); *G02B 6/3885*
(2013.01); *G02B 6/3887* (2013.01); *G02B*
*6/3891* (2013.01)

(56) References Cited

FOREIGN PATENT DOCUMENTS

| WO | 2017066137 A1 | 4/2017 |
| WO | 2018044565 A1 | 3/2018 |
| WO | 2019175702 A1 | 9/2019 |

* cited by examiner

10

11

14

16

13

18R,
retainer
attachment area 18R,
retainer
attachment area

10

13

P_retainer

11

18C,
coupling unit
attachment area 18C,
coupling unit
attachment area

OPTICAL CABLE ASSEMBLY WITH MISMATCHED FIBER LENGTH

CROSS REFERENCE TO RELATED APPLICATIONS

This application is a national stage filing under 35 U.S.C. 371 of PCT/IB2022/050436, filed Jan. 19, 2022, which claims the benefit of U.S. Provisional Application No. 63/199,833, filed Jan. 28, 2021, the disclosures of which are incorporated by reference in their entireties herein.

SUMMARY

In some aspects of the present description, an optical cable subassembly is provided, including a plurality of optical fibers, at least one light coupling unit including a coupling unit attachment area configured to receive and hold a free end of each optical fiber of the plurality of optical fibers at a coupling unit pitch, and a cable retainer adapted to be installed in a housing and including a retainer attachment area with a plurality of spaced-apart retainer fiber alignment features arranged at a retainer pitch, each of the plurality of optical fibers disposed in and attached to one of the plurality of retainer fiber alignment features.

In some aspects of the present description, a cable retainer adapted to be installed in a housing and configured to hold a plurality of optical fibers is provided, the cable retainer having a retainer attachment area including a plurality of spaced-apart retainer fiber alignment features arranged at a retainer pitch, such that when each of the plurality of optical fibers is disposed in and attached to one of the plurality of retainer fiber alignment features, the plurality of optical fibers extends through the retainer and is held at substantially the retainer pitch.

In some aspects of the present description, an optical connector assembly is provided, the optical connector assembly including a first optical connector and a second optical connector. The first optical connector includes a first housing, a plurality of first optical fibers having a first nominal fiber cladding diameter, D1, a first cable retainer installed in the first housing and having a plurality of first retainer fiber alignment features, and a first light coupling unit having a plurality of first coupling unit fiber alignment features. Each of the plurality of first optical fibers is disposed in and attached to one of the plurality of first retainer fiber alignment features, and each of the plurality of first coupling unit fiber alignment features is attached to a corresponding free end of each of the plurality of first optical fibers. The first retainer alignment features and the first coupling unit alignment features are separated by a first optical fiber length L1. The second optical connector includes a second housing, a plurality of second optical fibers having a second nominal fiber cladding diameter, D2, different from D1, a second cable retainer installed in the second housing and having a plurality of second retainer fiber alignment features, and a second light coupling unit having a plurality of second coupling unit fiber alignment features. Each of the plurality of second optical fibers is disposed in and attached to one of the plurality of second retainer fiber alignment features, and each of the plurality of second coupling unit fiber alignment features is attached to a corresponding free end of each of the plurality of second optical fibers. The second retainer alignment features and the second coupling unit alignment features are separated by a second optical fiber length L2, different from L1. The ratio of L1/L2 is such that, when the first optical connector is mated with the second optical connector, the first light coupling unit and the second light coupling unit rotate relative to the first housing and the second housing, respectively, and mate.

In some aspects of the present description, an optical connector assembly is provided, the optical connector assembly including a first optical connector and a second optical connector. The first optical connector includes a plurality of first optical fibers having a first fiber nominal cladding diameter, D1, a first housing including a first housing attachment area having a plurality of first housing fiber alignment features, and a first light coupling unit including a first coupling unit attachment area having a plurality of first coupling unit fiber alignment features. Each of the plurality of first optical fibers is disposed in and attached to one of the plurality of first housing fiber alignment features, and each of the plurality of first coupling unit fiber alignment features is attached to a corresponding free end of each of the plurality of first optical fibers. The plurality of first optical fibers defines a first optical fiber length L1 between the first housing fiber alignment features and the first coupling unit fiber alignment features. The second optical connector includes a plurality of second optical fibers having a second nominal fiber cladding diameter, D2, different than D1, a second housing including a second housing attachment area having a plurality of second housing fiber alignment features, and a second light coupling unit including a second coupling unit attachment area having a plurality of second coupling unit fiber alignment features. Each of the plurality of second optical fibers is disposed in and attached to one of the plurality of second housing fiber alignment features, and each of the plurality of second coupling unit fiber alignment features is attached to a corresponding free end of each of the plurality of second optical fibers. The plurality of second optical fibers defines a second optical fiber length L2 between the second housing fiber alignment features and the second coupling unit fiber alignment features, L2 different than L1. The ratio of L1/L2 is such that, when the first optical connector is mated with the second optical connector, the first light coupling unit and the second light coupling unit rotate relative to the first housing and the second housing, respectively, and mate.

In some aspects of the present description, an optical connector assembly is provided, the optical connector assembly including a first optical connector and a second optical connector configured to be mated with the first optical connector. The first optical connector includes a plurality of first optical fibers having a first nominal fiber cladding diameter, D1, extending between and held by a first attachment area of the first optical connector and a second attachment area of the first optical connector. The first attachment area of the first optical connector and the second attachment area of the first optical connector are separated by a distance L1, and the plurality of first optical fibers is free to bend over the distance L1. The second optical connector includes a plurality of second optical fibers having a second nominal fiber cladding diameter, D2, different from D1, extending between and held by a first attachment area of the second optical connector and a second attachment area of the second optical connector. The first attachment area of the second optical connector and the second attachment area of the second optical connector are separated by a distance L2 different than L1, and the plurality of second optical fibers free to bend over the distance L2. The ratio of L1/L2 is within 5% of $(D1/D2)^2$.

In some aspects of the present description, an optical connector assembly is provided, the optical connector assembly including a first optical connector and a second optical connector configured to be mated with the first optical connector. The first optical connector includes a plurality of first optical fibers having a first nominal fiber cladding diameter, D1, extending between and held by a first attachment area of the first optical connector and a second attachment area of the first optical connector. The first attachment area of the first optical connector and the second attachment area of the first optical connector are separated by a distance L1. At least one of the first attachment area of the first optical connector and the second attachment area of the first optical connector is configured to move relative to the other of the first attachment area of the first optical connector and the second attachment area of the first optical connector. The second optical connector includes a plurality of second optical fibers having a second nominal fiber cladding diameter, D2, different than D1, extending between and held by a first attachment area of the second optical connector and a second attachment area of the second optical connector. The first attachment area of the second optical connector and the second attachment area of the second optical connector are separated by a distance L2, different than L1. At least one of the first attachment area of the second optical connector and the second attachment area of the second optical connector is configured to move relative to the other of the first attachment area of the second optical connector and the second attachment area of the second optical connector. The ratio of L1/L2 is within 5% or (within 10%) of $(D1/D2)^2$.

DETAILED DESCRIPTION

Figure 1A:
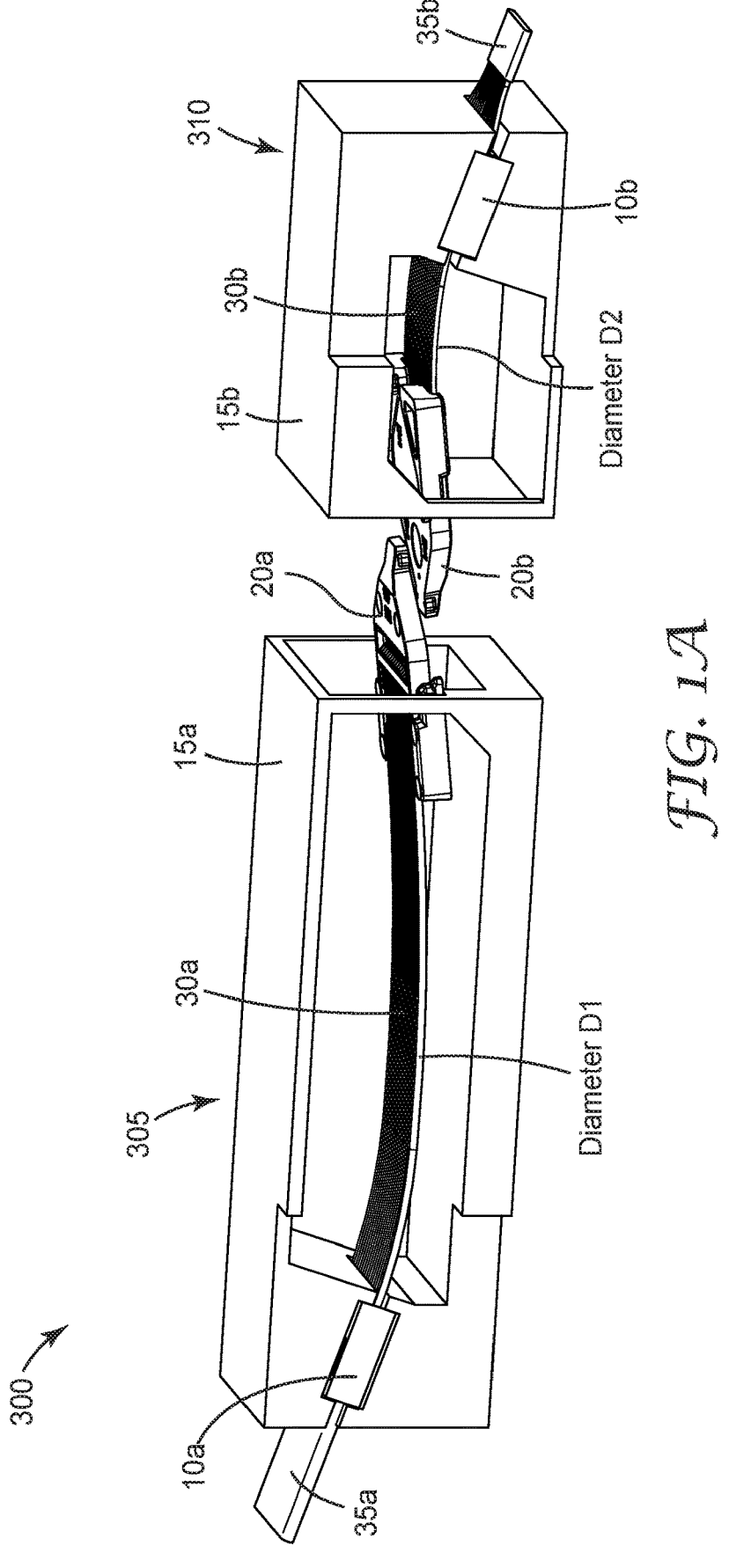
FIGS. 1A and 1B provide perspective views of an optical cable assembly in both unmated and mated positions, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical fiber connectors are connectors which allow the connection and disconnection between two optical waveguides (or two sets of optical waveguides, e.g., optical fibers) without requiring splicing of the optical waveguides. Typically, the two sets of waveguides (i.e., the sets being connected) have the same diameter to facilitate the connection process. However, standard optical fiber diameters may not be ideal for connecting to optical devices (e.g., a photonic integrated circuit, or PIC). For example, it may be desirable to use an optical fiber with a smaller cladding diameter for the purposes of bonding to the surface of the optical device (e.g., for use in a connector pigtail for the PIC).

According to some aspects of the present description, an optical cable subassembly serves as an adaptor between two disparate sizes of optical fiber (e.g., between standard fibers with a cladding diameter of 125 microns (e.g., micrometers) and PIC connector pigtail fibers with a cladding diameter of 80 microns). In some embodiments, such an optical cable subassembly includes a plurality of optical fibers, at least one light coupling unit (e.g., an optical ferrule) including a coupling unit attachment area configured to receive and hold a free end of each optical fiber of the plurality of optical fibers at a coupling unit pitch, and a cable retainer (e.g., an optical collet) adapted to be installed in an optical connector housing. In some embodiments, the cable retainer may include a retainer attachment area with a plurality of spaced-apart retainer fiber alignment features arranged at a retainer pitch. In some embodiments, each of the plurality of optical fibers may be disposed in and attached to one of the plurality of retainer fiber alignment features. In some embodiments, the plurality of optical fibers may extend through the cable retainer.

In some embodiments, the cable retainer may be fixed relative to the optical connector housing in which it is installed (e.g., installed in, affixed to, and/or adhered to the housing). In some embodiments, the plurality of spaced-apart retainer fiber alignment features may include a plurality of substantially parallel retainer grooves. In some embodiments, the plurality of spaced-apart retainer fiber alignment features may include a plurality of spaced-apart holes. In some embodiments, the cable retainer may further include an opening through which an adhesive may be applied to the plurality of optical fibers.

In some embodiments, the coupling unit attachment area may include a plurality of spaced-part coupling unit fiber alignment features arranged at the coupling unit pitch. In some embodiments, each of the coupling unit fiber alignment features may be attached to a corresponding free end of each optical fiber of the plurality of optical fibers. In some embodiments, the plurality of spaced-apart coupling unit fiber alignment features may include a plurality of substantially parallel coupling unit grooves. In some embodiments, the at least one light coupling unit may be configured such that it can rotate relative to the optical connector housing and/or the cable retainer (e.g., during a mating operation with a mating optical cable subassembly).

In some embodiments, the at least one light coupling unit and the cable retainer may be separated by a length of the plurality of optical fibers. In some embodiments, the length of the plurality of optical fibers between the light coupling unit (e.g., the coupling unit attachment area) and the cable retainer (e.g., the retainer attachment area) may be configured to allow a bend in the plurality of optical fibers that provides a predetermined mating spring force at a predetermined angle of the light coupling unit when installed in the optical connector housing.

In some embodiments, the optical cable subassembly may further include a ribbon cable including at least a portion of the plurality of optical fibers, wherein the optical fibers are constrained to a ribbon cable pitch when contained within the ribbon cable, and emerge from a first end of the ribbon cable and fan out to the (e.g., larger) retainer pitch of the cable retainer before entering a first side of the cable retainer. In some embodiments, the ribbon cable pitch may be smaller than the retainer pitch by at least 5%, or at least 10%, or at least 20%, or at least 25%, or at least 30%, or at least 40%. In some embodiments, each optical fiber of the plurality of optical fibers may include an outer (typically polymer) buffer layer, and the retainer pitch may be greater than a nominal diameter of the outer buffer layer by at least 5%, or at least 10%, or at least 20%, or at least 25%, or at least 30%, or at least 40%. In some embodiments, the ribbon cable pitch may be about 165 microns, and the retainer pitch may be greater than or equal to about 250 microns.

In some embodiments, the retainer pitch may be substantially equal to the coupling unit pitch. In some embodiments, the retainer pitch may be within about 5%, or about 10%, of the coupling unit pitch.

According to some aspects of the present description, a cable retainer is adapted to be installed in a housing and is configured to hold a plurality of optical fibers. In some embodiments, the cable retainer may have a retainer attachment area including a plurality of spaced-apart retainer fiber alignment features arranged at a retainer pitch, such that when each of the plurality of optical fibers is disposed in and attached to one of the plurality of retainer fiber alignment features, the plurality of optical fibers extends through the retainer and is held at substantially the retainer pitch.

In some embodiments, the plurality of spaced-apart retainer fiber alignment features may include a plurality of substantially parallel retainer grooves, adapted to hold the plurality of optical fibers at a predetermined pitch (e.g., to substantially match the fiber-to-fiber pitch of another optical component, such as an optical ferrule or a PIC, or to change the pitch from a second different pitch of the plurality of optical fibers that is seen outside the cable retainer). In other embodiments, the plurality of spaced-apart retainer fiber alignment features may include a plurality of spaced-apart holes. In such embodiments, each of the plurality of optical fibers may extend through the spaced-apart holes and be held at the predetermined pitch. In some embodiments, each of the plurality of spaced-apart holes may include a series of two or more holes, aligned in a same linear direction, so that an optical fiber may pass through the series of holes and be held in place. In some embodiments, the cable retainer may further include an opening through which an adhesive may be applied to the plurality of optical fibers.

In some embodiments, the cable retainer may be part of an optical cable subassembly. Such an optical cable subassembly may include a cable retainer as described herein and a plurality of optical waveguides (e.g., optical fibers). In some embodiments, each of the plurality of optical waveguides may be disposed in and attached to one of the plurality of retainer fiber alignment features. In such embodiments, each of the plurality of optical fibers may include an outer buffer layer such that the retainer pitch is greater than a nominal diameter of the outer buffer layer by at least 20%, or at least 25%, or at least 30%, or at least 40%. In some of these embodiments, the diameter of the outer buffer layer may be about 165 microns, and the retainer pitch may be greater than or equal to about 250 microns.

In some embodiments, the cable retainer may be part of an optical cable subassembly. Such an optical cable subassembly may include a cable retainer as described herein and a plurality of optical fibers, each of the plurality of optical fibers disposed in and attached to one of the plurality of retainer fiber alignment features. In such embodiments, a center-to-center pitch of the plurality of optical fibers (distance from the center of one fiber to the center of an adjacent fiber) may increase from a first side of the cable retainer to a second side of the cable retainer by at least 20%, or at least 25%, or at least 30%, or at least 40%. Stated another way, the pitch of the plurality of retainer fiber alignment features (e.g., grooves or holes) may be such that the pitch of the optical fibers placed in the retainer fiber alignment features may increase (e.g., cause the fibers to "fan out") from a pitch of the fibers prior to entering the cable retainer. The pitch of the plurality of retainer fiber alignment features may alternatively be smaller than the pitch of the fibers entering the cable retainer (e.g., forcing the fibers to move closer to each other).

In some embodiments, the cable retainer may be part of an optical cable subassembly. Such an optical cable subassembly may include a cable retainer as described herein, a plurality of optical fibers, and at least one light coupling unit (e.g., an optical ferrule). In some embodiments, each of the plurality of optical fibers may be disposed in and attached to one of the plurality of retainer fiber alignment features. In some embodiments, the light coupling unit may include a coupling unit attachment area having a plurality of spaced-apart fiber coupling unit fiber alignment features (e.g., a plurality of substantially parallel grooves or spaced-apart holes) arranged at a coupling unit pitch. In such embodiments, each of the coupling unit fiber alignment features may be attached to a corresponding free end of the plurality of optical fibers. In some embodiments, the retainer pitch may be substantially the same as the coupling unit pitch, or the retainer pitch may be within about 5%, or about 10%, of the coupling unit pitch.

According to some aspects of the present description, an optical connector assembly may include a first optical connector and a second optical connector. In some embodiments, the first optical connector may include a first housing, a plurality of first optical fibers having a first nominal fiber cladding diameter, D1, a first cable retainer installed in the first housing and having a plurality of first retainer fiber alignment features, and a first light coupling unit (e.g., an optical ferrule) having a plurality of first coupling unit fiber alignment features.

In some embodiments, each of the plurality of first optical fibers may be disposed in and attached to one of the plurality of first retainer fiber alignment features, and each of the plurality of first coupling unit fiber alignment features may be attached to a corresponding free end of each of the plurality of first optical fibers. In some embodiments, the first retainer alignment features and the first coupling unit alignment features may be separated by a first optical fiber length L1.

In some embodiments, the second optical connector includes a second housing, a plurality of second optical fibers having a second nominal fiber cladding diameter, D2, different from D1, a second cable retainer installed in the second housing and having a plurality of second retainer fiber alignment features, and a second light coupling unit having a plurality of second coupling unit fiber alignment features. In some embodiments, each of the plurality of second optical fibers may be disposed in and attached to one of the plurality of second retainer fiber alignment features, and each of the plurality of second coupling unit fiber alignment features may be attached to a corresponding free end of each of the plurality of second optical fibers. In some embodiments, the second retainer alignment features and the second coupling unit alignment features are separated by a second optical fiber length L2, different from L1.

In some embodiments, the ratio of L1/L2 is such that, when the first optical connector is mated with the second optical connector, the first light coupling unit and the second light coupling unit may rotate relative to the first housing and the second housing, respectively, and mate. Stated another way, when the first optical connector and second optical connector are fully mated, the length L1 of optical fibers and length L2 of optical fibers may bend, and the first optical connector and second optical connector may be forced together (e.g., held together by corresponding mechanical alignment features), causing them to rotate to an orientation where the force of the bent optical fiber lengths L1 and L2 hold them fully mated and aligned. In some embodiments, the ratio L1/L2 may be within 5%, or within 10% of $(D1/D2)^2$, or may be substantially equal to $(D1/D2)^2$.

In some embodiments, the plurality of first retainer fiber alignment features may include a plurality of substantially parallel first retainer grooves, and the plurality of second retainer fiber alignment features may include a plurality of substantially parallel second retainer grooves. In some embodiments, the plurality of first coupling unit fiber alignment features may include a plurality of substantially parallel first coupling unit grooves, and the plurality of second coupling unit fiber alignment features may include a plurality of substantially parallel second coupling unit grooves.

In some embodiments, the first optical fiber length L1 may be configured to allow a bend in the plurality of first optical fibers that provides a first predetermined mating spring force at a first predetermined angle of the first light coupling unit when installed in the first housing. In some embodiments, the second optical fiber length L2 may be configured to allow a bend in the plurality of second optical fibers that provides a second predetermined mating spring force at a second predetermined angle of the second light coupling unit when installed in the second housing. In some embodiments, the first optical fiber length L1 may be greater than the second optical fiber length L2 by at least 10%, or at least 15%, or at least 25%, or at least 30%.

In some embodiments, the plurality of first retainer fiber alignment features may be spaced at a first retainer pitch, and the plurality of first coupling unit fiber alignment features may be spaced at a first coupling unit pitch, wherein the first retainer pitch is substantially the same as the first coupling unit pitch, or the first retainer pitch may be within about 5%, or about 10%, of the first coupling unit pitch. In some embodiments, the plurality of second retainer fiber alignment features may be spaced at a second retainer pitch, and the plurality of second coupling unit fiber alignment features may be spaced at a second coupling unit pitch, wherein the second retainer pitch is substantially the same as the second coupling unit pitch, or the first retainer pitch may be within about 5%, or about 10%, of the first coupling unit pitch.

In some embodiments, each first optical fiber of the plurality of first optical fibers may include an outer buffer layer. In some embodiments, the first retainer pitch may be greater than a nominal diameter of the outer buffer layer by at least 5%, or at least 10%, or at least 20%, or at least 25%, or at least 30%, or at least 40%. In some embodiments, each second optical fiber of the plurality of second optical fibers may include an outer buffer layer. In some embodiments, the second retainer pitch may be greater than a nominal diameter of the outer buffer layer by at least 5%, or at least 10%, or at least 20%, or at least 25%, or at least 30%, or at least 40%.

According to some aspects of the present description, an optical connector assembly may include a first optical connector and a second optical connector. In some embodiments, the first optical connector may include a plurality of first optical fibers having a first fiber nominal cladding diameter, D1, a first housing including a first housing attachment area with a plurality of first housing fiber alignment features, and a first light coupling unit including a first coupling unit attachment area with a plurality of first coupling unit fiber alignment features. In some embodiments, each of the plurality of first optical fibers may be disposed in and attached to one of the plurality of first housing fiber alignment features. In some embodiments, each of the plurality of first coupling unit fiber alignment features may be attached to a corresponding free end of each of the plurality of first optical fibers. In some embodiments, the plurality of first optical fibers may define a first optical fiber length L1 between the first housing fiber alignment features and the first coupling unit fiber alignment features.

In some embodiments, the second optical connector may include a plurality of second optical fibers having a second nominal fiber cladding diameter, D2, different than D1, a second housing including a second housing attachment area with a plurality of second housing fiber alignment features, and a second light coupling unit including a second coupling unit attachment area with a plurality of second coupling unit fiber alignment features. In some embodiments, each of the plurality of second optical fibers may be disposed in and attached to one of the plurality of second housing fiber alignment features. In some embodiments, each of the plurality of second coupling unit fiber alignment features may be attached to a corresponding free end of each of the plurality of second optical fibers. In some embodiments, the plurality of second optical fibers may define a second optical fiber length L2, different than L1, between the second housing fiber alignment features and the second coupling unit fiber alignment features.

In some embodiments, the ratio of L1/L2 may be such that, when the first optical connector is mated with the second optical connector, the first light coupling unit and the second light coupling unit rotate relative to the first housing and the second housing, respectively, and mate. In some embodiments, the rotation of the first light coupling unit and the second light coupling unit is enabled by a decreased radius of curvature (i.e., an increased bending) in optical fiber lengths L1 and L2. In such embodiments, the increased bend in optical fiber lengths L1 and L2 provide a predetermined mating force which presses the mated light coupling units together and helps them to maintain a proper optical alignment.

In some embodiments, the ratio of L1/L2 may be within 5%, or within 10%, of $(D1/D2)^2$. In some embodiments, the ratio of L1/L2 may be substantially equal to $(D1/D2)^2$. In some embodiments, the first optical fiber length, L1, may be greater than the second optical fiber length, L2, by at least 10%, or at least 15%, or at least 25%, or at least 30%.

In some embodiments, the plurality of first housing fiber alignment features may include a plurality of substantially parallel first housing grooves, and the plurality of second housing fiber alignment features may include a plurality of substantially parallel second housing grooves. In some embodiments, the plurality of first housing fiber alignment features may include a plurality of spaced apart first housing holes, and the plurality of second housing fiber alignment features may include a plurality of spaced-apart second housing holes.

In some embodiments, the plurality of first coupling unit fiber alignment features may include a plurality of substantially parallel first coupling unit grooves, and the plurality of second coupling unit fiber alignment features may include a plurality of substantially parallel second coupling unit grooves. In some embodiments, the plurality of first coupling fiber alignment features may include a plurality of spaced apart first coupling unit holes, and the plurality of second coupling unit fiber alignment features may include a plurality of spaced-apart second coupling unit holes.

In some embodiments, the first housing attachment area may include a first cable retainer, and the second housing attachment area may include a second cable retainer. Stated another way, the first housing attachment area and the second housing attachment area may be integral to the first housing and the second housing, respectively, or one or both may be a separate cable retainer (e.g., an optical fiber collet).

According to some aspects of the present description, an optical connector assembly may include a first optical connector and a second optical connector configured to be mated with the first optical connector.

In some embodiments, the first optical connector may include a plurality of first optical fibers having a first nominal fiber cladding diameter, D1, extending between and held by a first attachment area of the first optical connector and a second attachment area of the first optical connector. In some embodiments, the first attachment area of the first optical connector and the second attachment area of the first optical connector may be separated by a distance L1, and the plurality of first optical fibers may be free to bend over the distance L1.

In some embodiments, the second optical connector may include a plurality of second optical fibers having a second nominal fiber cladding diameter, D2, different from D1, extending between and held by a first attachment area of the second optical connector and a second attachment area of the second optical connector. In some embodiments, the first attachment area of the second optical connector and the second attachment area of the second optical connector may be separated by a distance L2 different than L1, and the plurality of second optical fibers may be free to bend over the distance L2. In some embodiments, the ratio of L1/L2 may be within 5%, or within 10%, of (D1/D2)$^2$. In some embodiments, the ratio of L1/L2 may be substantially equal to (D1/D2)$^2$. In some embodiments, the plurality of first optical fibers and the plurality of second optical fibers may bend (or an existing bend may increase) when the first optical connector is mated with the second optical connector.

In some embodiments, the first attachment area of the first optical connector may be a first light coupling unit (e.g., an optical ferrule), and the second attachment area of the first optical connector may be a first cable retainer. In some embodiments, the first attachment area of the second optical connector may be a second light coupling unit (e.g., an optical ferrule), and the second attachment area of the second optical connector may be a second cable retainer. In such embodiments, the first light coupling unit and the second light coupling unit may rotate when mating with respect to the first optical connector and the second optical connector, respectively, and the first cable retainer and the second cable retainer may remain stationary with respect to the first optical connector and the second optical connector, respectively.

According to some aspects of the present description, an optical connector assembly may include a first optical connector and a second optical connector configured to be mated with the first optical connector. In some embodiments, the first optical connector ay include a plurality of first optical fibers having a first nominal fiber cladding diameter, D1, extending between and held by a first attachment area of the first optical connector and a second attachment area of the first optical connector. In some embodiments, the first attachment area of the first optical connector and the second attachment area of the first optical connector are separated by a distance L1. In some embodiments, at least one of the first attachment area of the first optical connector and the second attachment area of the first optical connector may be configured to move relative to the other of the first attachment area of the first optical connector and the second attachment area of the first optical connector.

In some embodiments, the second optical connector may include a plurality of second optical fibers having a second nominal fiber cladding diameter, D2, different than D1, extending between and held by a first attachment area of the second optical connector and a second attachment area of the second optical connector. In some embodiments, the first attachment area of the second optical connector and the second attachment area of the second optical connector may be separated by a distance L2, different than L1. In some embodiments, at least one of the first attachment area of the second optical connector and the second attachment area of the second optical connector may be configured to move relative to the other of the first attachment area of the second optical connector and the second attachment area of the second optical connector. In some embodiments, the ratio of L1/L2 may be within 5%, or within 10%, of (D1/D2)$^2$. In some embodiments, the ratio of L1/L2 may be substantially equal to (D1/D2)$^2$.

Figure 1B:
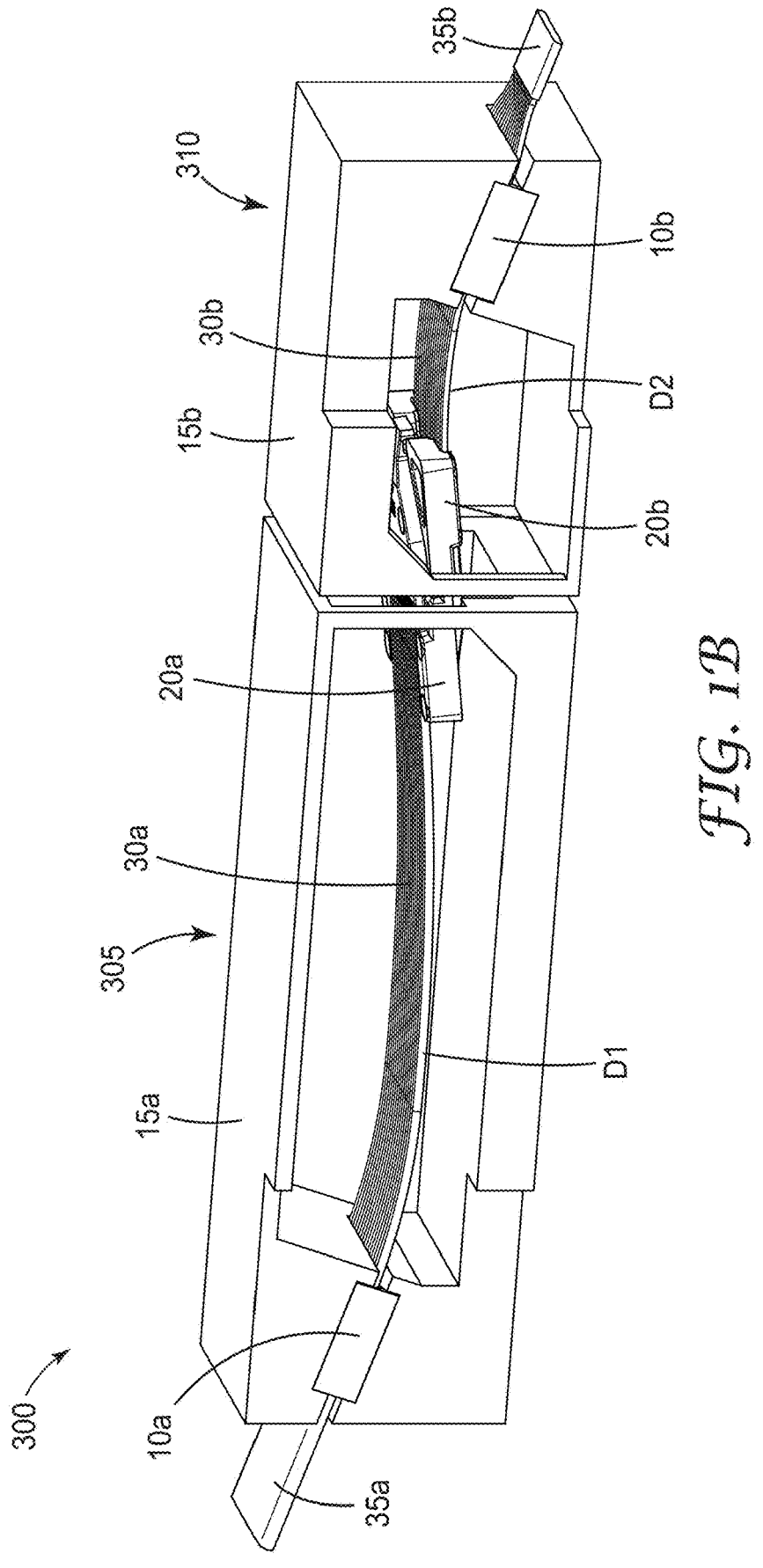
Figure 10A:
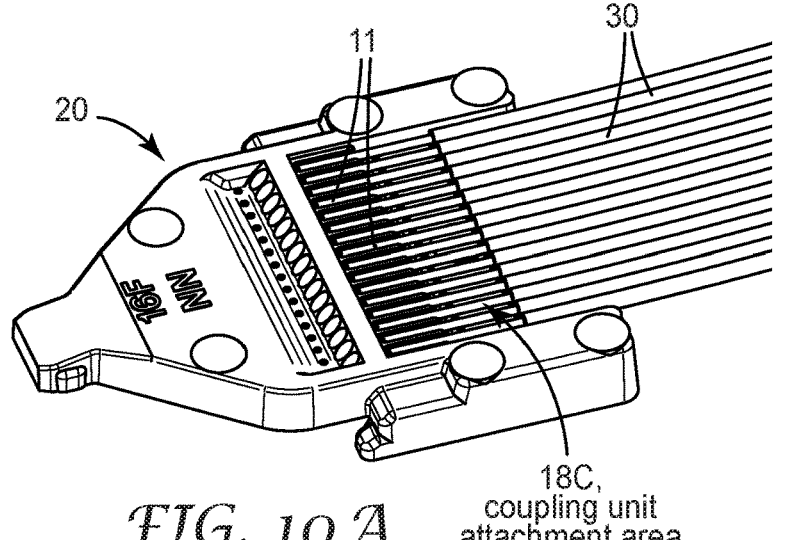
FIGS. 10A and 10B show details of a light coupling unit, in accordance with an embodiment of the present description.

In some embodiments, the first attachment area of the first optical connector and the second attachment area of the first optical connector may rotate relative to the other of the first attachment area of the first optical connector and the second attachment area of the first optical connector. In some embodiments, one of the first attachment area of the second optical connector and the second attachment area of the second optical connector may rotate relative to the other of the first attachment area of the second optical connector and the second attachment area of the second optical connector, when the first optical connector is mated to the second optical connector Turning now to the drawings, FIGS. 1A and 1B provide perspective views of an optical cable assembly in both unmated and mated positions, according to the present description. It should be noted that, unless otherwise specified herein, components in each figure which share like reference designators with components in other figures shall be assumed to have the same function. In such cases, the description of the function of like-numbered components may not be repeated in subsequent figures and should be assumed to serve the same function or purpose. For example, the components shown in FIGS. 1A and 1B are identical, except for the fact that the optical cable assembly 300 is shown in an unmated position in FIG. 1A and a mated position in FIG. 1B. In addition, reference designators which use a common numeral in combination with a letter (e.g., 10*a* and 10*b,* or 300 and 300*a*) shall be assumed to refer to variants of the same basic component. For example, in FIG. 1A, 10*a* is used to refer to a first cable retainer, and 10*b* is used to refer to a second cable retainer. In other figures, the numeral 10 (without a letter) is used to refer more generally to a cable retainer. In some cases, the letter suffix may indicate a different embodiment of the component (e.g., differing structurally or functionally in at least some small way), while in other cases, the letter suffix may simply be used to distinguish position or location (e.g., between a first cable retainer, 10*a,* in a first connector and a second cable retainer, 10*b,* in a second optical connector, wherein, at least in some embodiments, 10*a* and 10*b* may be otherwise substantially identical in function).

Looking first at FIG. 1A, an optical cable assembly 300 is shown in an unmated configuration. In some embodiments, optical cable assembly 300 includes a first optical connector 305 and a second optical connector 310. The first optical connector 305 may include a first housing 15*a,* a first light coupling unit 20*a* (e.g., an optical ferrule, defining a first coupling unit attachment area for optical waveguides) and a first cable retainer 10*a* (e.g., a collet, or first retainer attachment area), separated by a first plurality of optical waveguides 30*a* (e.g., a plurality of optical fibers). In some embodiments, the first plurality of optical waveguides 30*a* may enter first housing 15*a* at one end of first housing 15*a,* pass through and be held in place by first cable retainer 10*a* (which, in some embodiments, may be fixed relative to first housing 15*a*) and extend to first light coupling unit 20*a.* In some embodiments, the first plurality of optical waveguides 30*a* may extend out from a ribbon cable 35*a* and be held at a fixed center-to-center pitch relative to cable retainer 10*a* (i.e., a first retainer pitch). Each optical waveguide of the first plurality of optical waveguides 30*a* may have a first diameter, D1. In some embodiments, the first plurality of optical waveguides 30*a* may be allowed to bend between a first retainer attachment area defined by cable retainer 10*a* and a first coupling unit attachment area defined by light coupling unit 20*a.* Additional details related to the pitch, diameter, and attachment areas of the optical fibers 30*a* are provided elsewhere herein.

The second optical connector 310 may include a second housing 15*b,* a second light coupling unit 20*b* (e.g., an optical ferrule, defining a first coupling unit attachment area for optical waveguides) and a second cable retainer 10*b* (e.g., a collet, or first retainer attachment area), separated by a second plurality of optical waveguides 30*b* (e.g., a plurality of optical fibers). In some embodiments, the second plurality of optical waveguides 30*a* may enter second housing 15*b* at one end of second housing 15*b,* pass through and be held in place by second cable retainer 10*b* (which, in some embodiments, may be fixed relative to second housing 15*b*) and extend to second light coupling unit 20*b.* In some embodiments, the second plurality of optical waveguides 30*b* may extend out from a ribbon cable 35*b* and be held at a fixed center-to-center pitch relative to cable retainer 10*b* (i.e., a second retainer pitch). Each optical waveguide of the second plurality of optical waveguides 30*b* may have a second diameter, D2. In some embodiments, first diameter D1 and second diameter D2 may be different.

In some embodiments, the second plurality of optical waveguides 30*b* may be allowed to bend between a second retainer attachment area defined by second cable retainer 10*b* and a second coupling unit attachment area defined by second light coupling unit 20*b.* Additional details related to the pitch, diameter, and attachment areas of the optical fibers 30*b* are provided elsewhere herein.

Figure 3A:
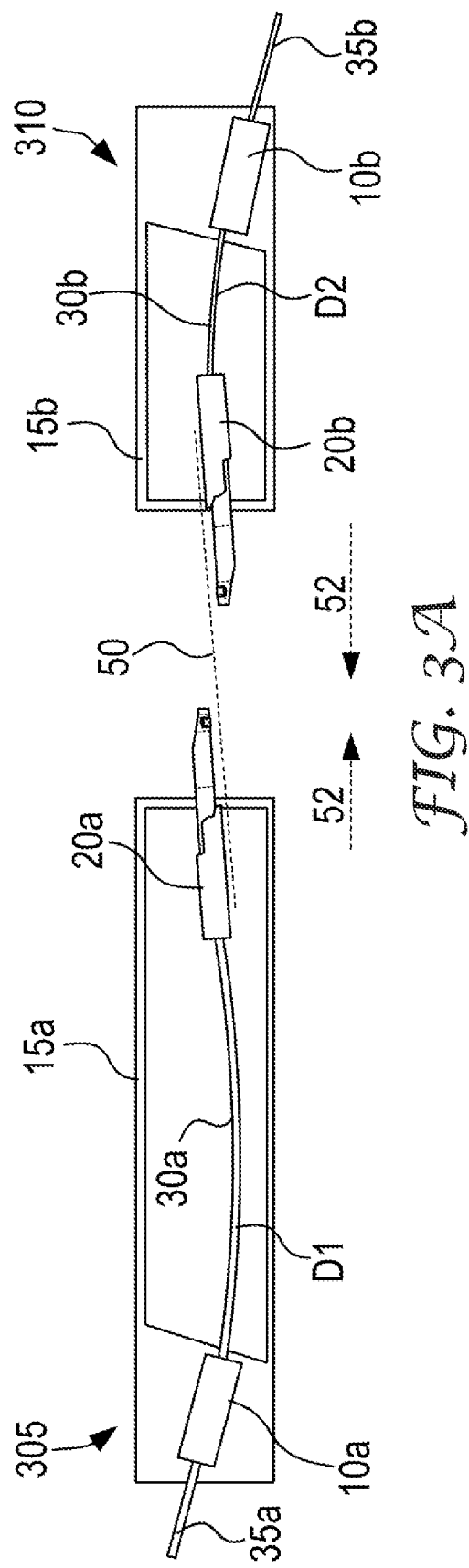
FIGS. 3A and 3B provide side, cut-away views of an optical connector assembly in both unmated and mated positions, in accordance with an embodiment of the present description.
Figure 3B:
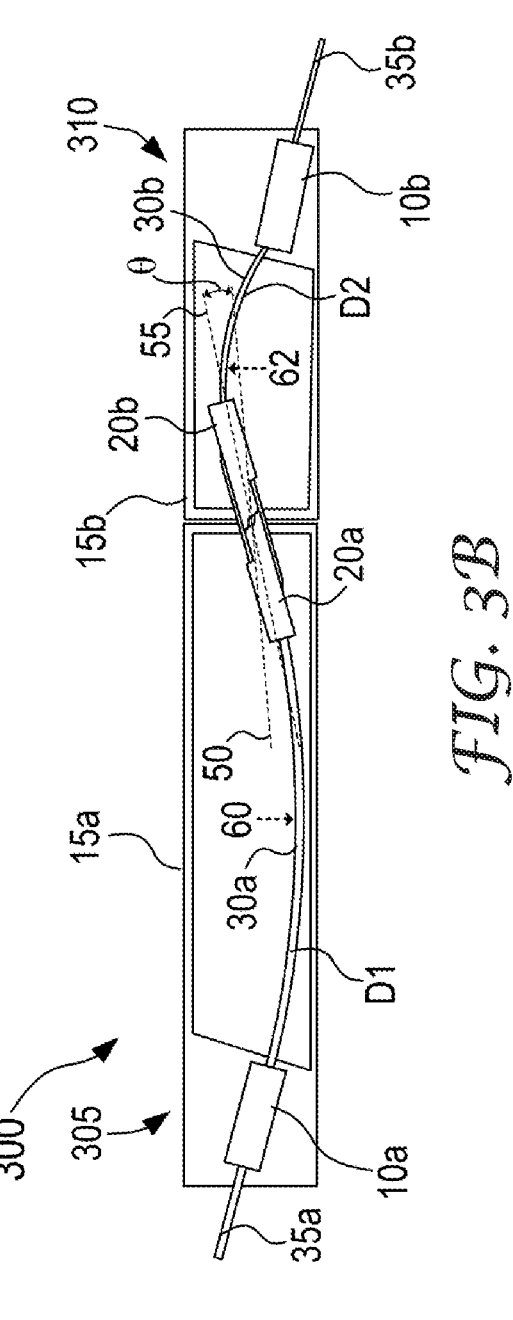

FIG. 1B shows the optical cable assembly 300 in a mated configuration. In some embodiments, as first optical connector 305 is mated with second optical connector 310, the first light coupling unit 20*a* and second light coupling unit 20*b* engage (in some embodiments, first light coupling unit 20*a* and second light coupling unit 20*b* may have complimentary mechanical features which are engaged to hold the mated coupling units together) and may rotate together relative to their respective housing to create a pre-determined mating force to hold the light coupling units in a mated and optically aligned position. In some embodiments, as light coupling unit 20*a* and light coupling unit 20*b* mate, the first plurality of optical fibers 30*a* and the second plurality of optical fibers 30*b* may bend or flex, allowing first light coupling unit 20*a* and second light coupling unit 20*b* to rotate relative to first housing 15*a* and second housing 15*b,* respectively. FIGS. 3A and 3B better illustrate the rotation of light coupling units and flexing of optical fibers and is discussed elsewhere herein.

Figure 2A:
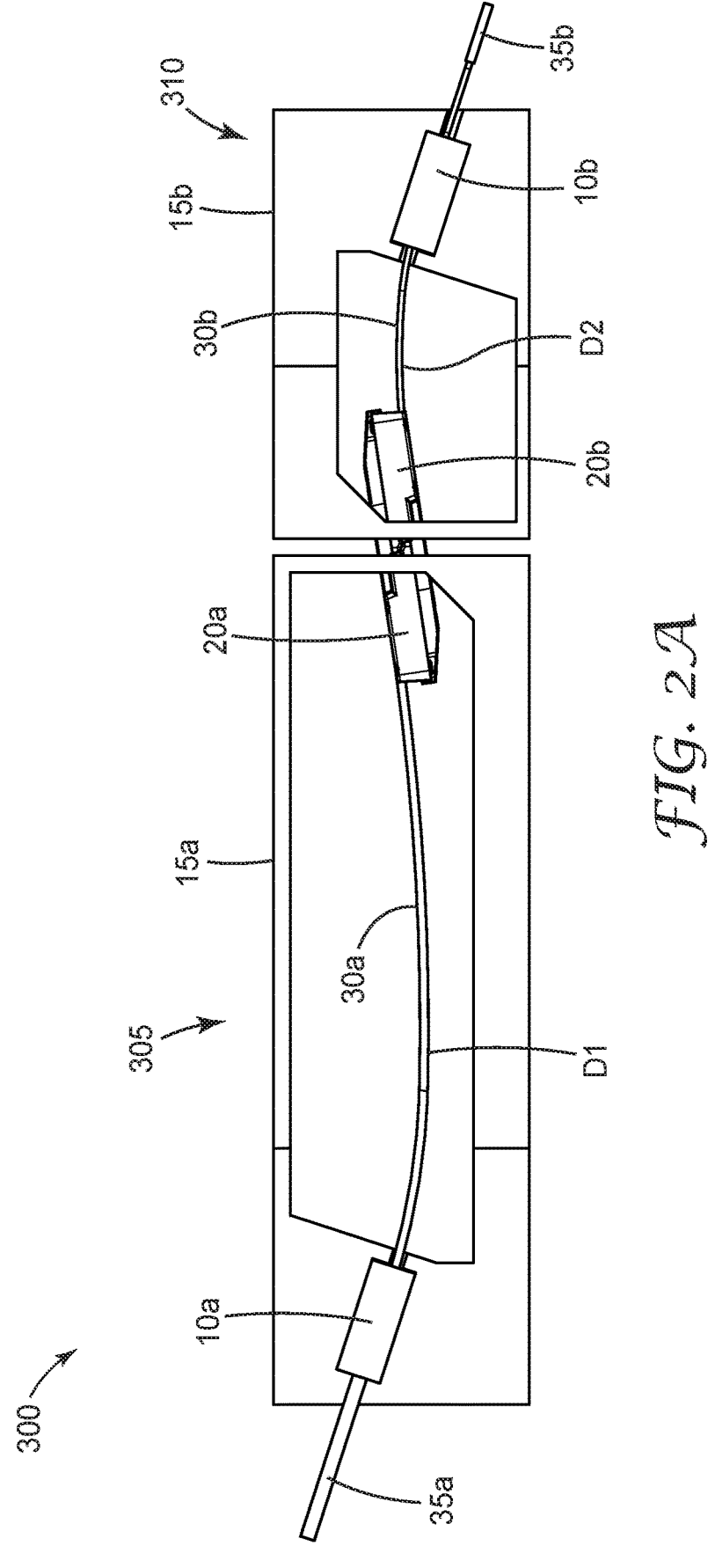
FIGS. 2A and 2B are side views of an optical cable assembly, in accordance with an embodiment of the present description.
Figure 2B:
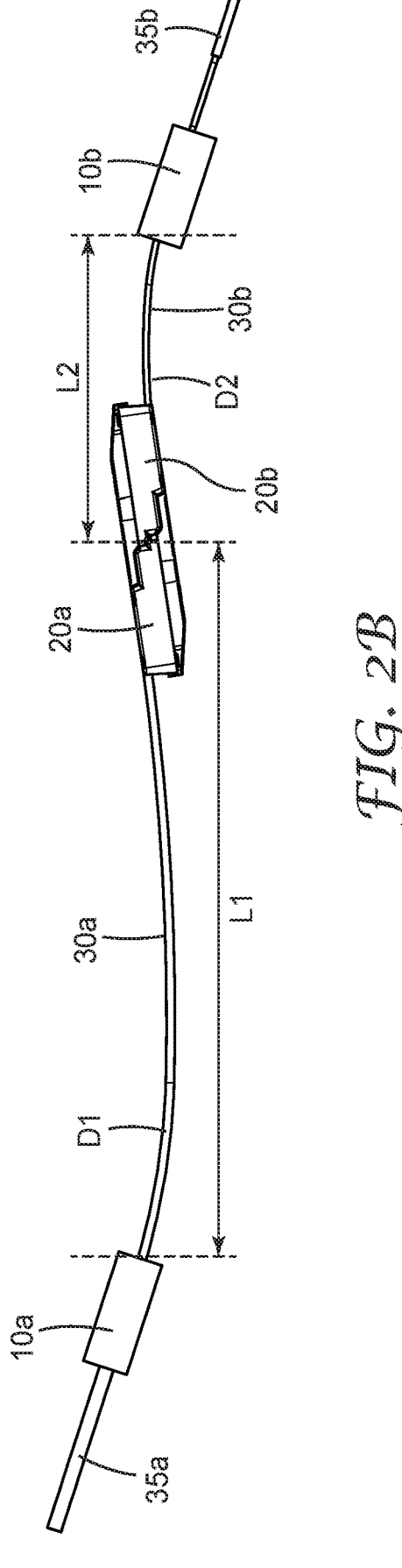

FIGS. 2A and 2B are side views of the optical cable assembly 300 of FIGS. 1A and 1B. FIG. 2A shows a side view of optical cable assembly 300 in a mated configuration. In FIG. 2B, first housing 15*a* and second housing 15*b* are not shown in order to focus more on the mating components with the optical connectors 305 and 310 of FIG. 2A. The components of FIG. 2A are common to and discussed elsewhere herein relative to FIGS. 1A and 1B. FIG. 2B includes many of the same components, but illustrates that the length L1 of the first plurality of optical fibers 30*a* may be different than the length L2 of the second plurality of optical fibers 30*b.* In some embodiments, a relationship may exist between the ratio of L1/L2 that is dependent on the ratio of the square of D1/D2, as discussed elsewhere herein. For example, and speaking generally, to provide a similar spring force or mating force between two pluralities of optical fibers such as 30*a* and 30*b* which have different diameters D1 and D2, respectively, lengths L1 and L2 may need to be different. A larger diameter of optical fiber, such as that shown as D1, may need to extend over a larger length L1, to provide a mating force substantially similar to the mating force created by optical fibers of smaller diameter D2 and shorter length L2. In some embodiments, determination of the proper fiber lengths for the optical connectors may be determined by the following equation:

$$L1/L2 \approx (D1/D2)^2$$

This relationship assures that, when in the properly mated configuration, the forces generated by the bending of the first and second pluralities of optical fibers are substantially the same. In some embodiments, L1/L2 may be substantially equal to $(D1/D2)^2$. In some embodiments, L1/L2 may be within 5%, or within 10%, of $(D1/D2)^2$.

It should be noted that other factors may require a difference in length of the first plurality of optical fibers 30*a* and the second plurality of optical fibers 30*b,* even when D1 is substantially equal to D2. In some embodiments, for example, the first plurality of optical fibers 30*a* and the second plurality of optical fibers 30*b* may be made of different materials with different respective physical properties (e.g., different material stiffnesses). In such embodiments, the lengths L1 and L2 may be calculated based on the physical property of each material, rather than the diameter of the optical waveguides. In some embodiments, light coupling units 20 may play a role in the mechanics of fiber bending. This effect may be compensated by interpreting lengths L1 and L2 to include portions of the coupling units as indicated in FIG. 2B.

FIGS. 3A and 3B provide side, cut-away views of an optical connector assembly 300 in both unmated and mated positions, showing additional detail on the rotation of light coupling units and the flexing of optical waveguides. As shown in FIG. 3A, showing optical connector assembly 300 in an unmated position, first light coupling unit 20*a* and second light coupling unit 20*b* are shown with an initial plane of orientation 50 relative to first housing 15*a* and second housing 15*b*. In some embodiments, initial plane of orientation 50 may be substantially parallel to mating direction 52. In other embodiments, initial plane of orientation 50 may be at an angle to mating direction 52. Also, it should be noted that, although only one plane of orientation 50 is shown in FIG. 3A, it is possible that the initial plane of orientation of the first light coupling unit 20*a* and second light coupling unit 20*b* may be different.

As the first optical connector 305 and second optical connector 310 are brought together into a mating configuration, as shown in FIG. 3B, first light coupling unit 20*a* and second light coupling unit 20*b* engage and may rotate together into second plane or orientation 55 at an angle θ relative to initial plane of orientation 50. In some embodiments, the angle θ may be about 5° or greater. In some embodiments, as first light coupling unit 20*a* and second light coupling unit 20*b* mate and rotate to plane of orientation 55, the first plurality of optical waveguides 30*a* may flex to new position 60 from its resting position in the unmated configuration (as shown in FIG. 3A), and the second plurality of optical waveguides 30*b* may flex to new position 62 from its resting position in the unmated configuration.

Figure 4:
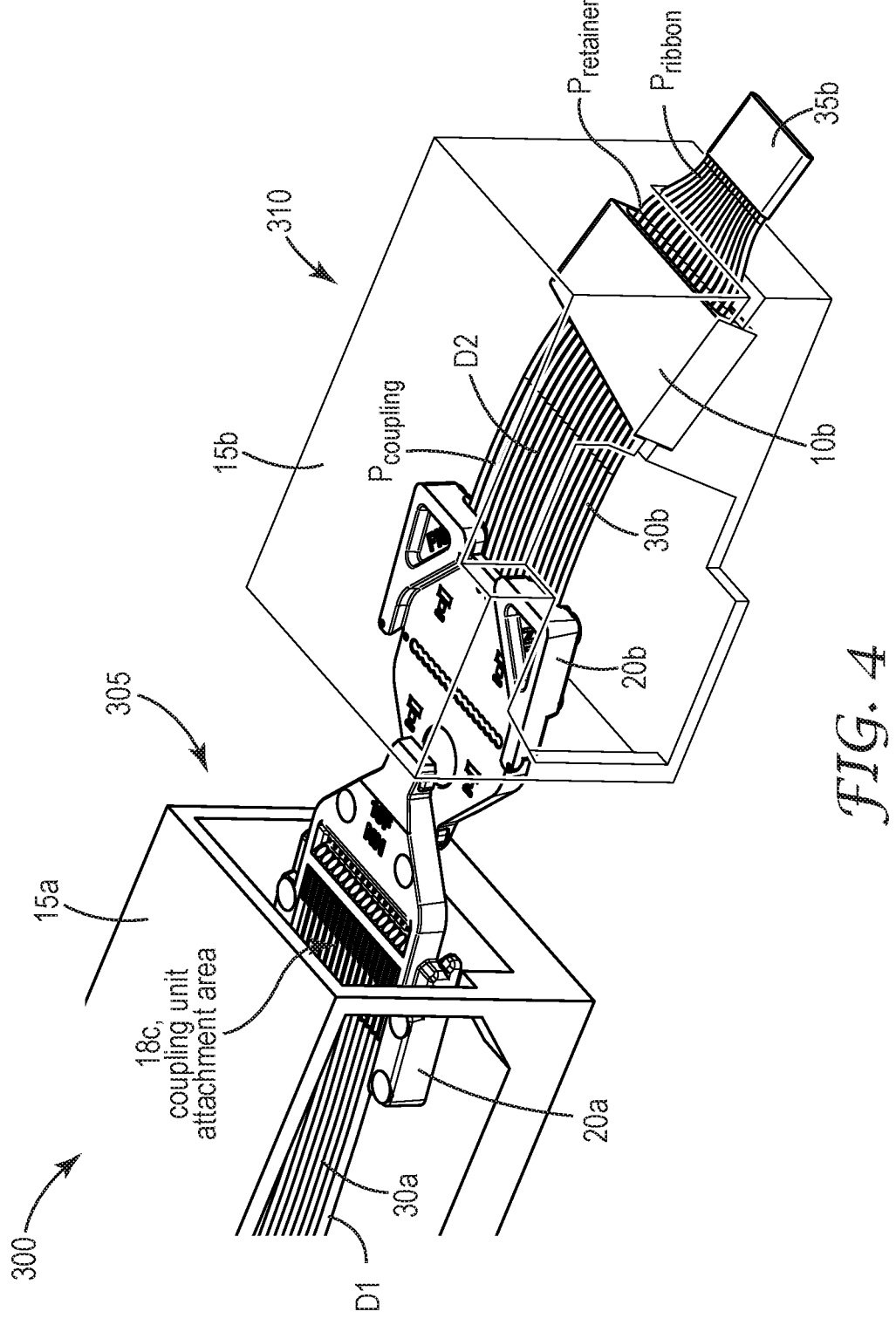
FIG. 4 provides a perspective view of an optical connector assembly showing additional detail, in accordance with an embodiment of the present description.

FIG. 4 provides a perspective view of optical connector assembly 300 showing additional detail. An optical connector assembly 300 includes a first optical connector 305 and a second optical connector 310 (second housing 15*b* of second optical connector 310 is shown with partial transparency to show internal details). In some embodiments, first optical connector 305 includes a first light coupling unit 20*a* and a first plurality of optical waveguides 30*a* at least partially enclosed within first connector housing 15*a*. First light coupling unit 20*a* may include a first coupling unit attachment area 18C where each of the first plurality of optical waveguides 30*a* is attached to first light coupling unit 20*a*. In some embodiments, first coupling unit attachment area 18*c* may include a plurality of substantially parallel first coupling unit fiber alignment features, each of the coupling unit fiber alignment features retaining a free end of an optical waveguide (e.g., an optical fiber) of the first plurality of optical waveguides 30*a*. Additional detail on the coupling unit fiber alignment features is provided elsewhere herein.

In some embodiments, second optical connector 310 includes a second light coupling unit 20*b* and a second plurality of optical waveguides 30*b* at least partially enclosed within second connector housing 15*b*. Second light coupling unit 20*b* may include a second coupling unit attachment area (not shown in FIG. 4 but similar to first coupling unit attachment area 18*c*) where each of the second plurality of optical waveguides 30*b* is attached to first light coupling unit 20*b*. In some embodiments, the second coupling unit attachment area may include a plurality of substantially parallel second coupling unit fiber alignment features, each of the coupling unit fiber alignment features retaining a free end of an optical waveguide (e.g., an optical fiber) of the second plurality of optical waveguides 30*b*. Additional detail on the coupling unit fiber alignment features is provided elsewhere herein.

Focusing on second optical connector 310, it is shown that the pitch of the plurality of optical fibers 30*b* may vary from point to point within the second optical connector 310, as well as outside connector 310. For the purposes of this document, "pitch" shall be defined as a center-to-center spacing between adjacent optical waveguides. In some embodiments, plurality of optical waveguides 30*b* may emerge from a ribbon cable 35*b,* where they have a first pitch $P_{ribbon}$, and fan out to a second, larger pitch, $P_{retainer}$. For example, each of the optical waveguides of the second plurality of optical waveguides 30*b* may have a buffer diameter which is smaller than the buffer diameter of first plurality of optical waveguides 30*a* in first (mating) optical connector 305.

In one example, fibers may have a cladding diameter D2 of approximately 80 microns and a buffer diameter of approximately 165 microns, such that pitch $P_{ribbon}$ may be approximately 165 microns. In order for the second plurality of optical waveguides 30*b* to properly align with the first plurality of optical waveguides 30*a* in first optical connector 305, the pitch $P_{ribbon}$ emerging from the ribbon cable 35*b* needs to be fanned out to a pitch $P_{retainer}$ that substantially matches the pitch of the first plurality of optical waveguides 30*a* in the first optical connector 305.

In some embodiments, one of the functions of cable retainer 10 is to hold smaller diameter fibers at a pitch that will substantially match the pitch in the light coupling unit, so that it can align properly with larger diameter fibers in the mating light coupling unit. In one example, coupling unit 20*a* holds larger fibers 30*a* with buffer diameters of 250 microns at the smallest practical pitch of approximately 250 microns. Therefore, mating coupling unit 20*b* must also hold its smaller fibers 30*b* with 165-micron diameter buffers at a pitch of 250 microns. If smaller fibers 30*b* are first installed in cable retainer 10*b* at that same larger pitch, 250 microns, subsequent attachment of those fibers to coupling unit 20*b* is facilitated.

Figures 5A, 5B:
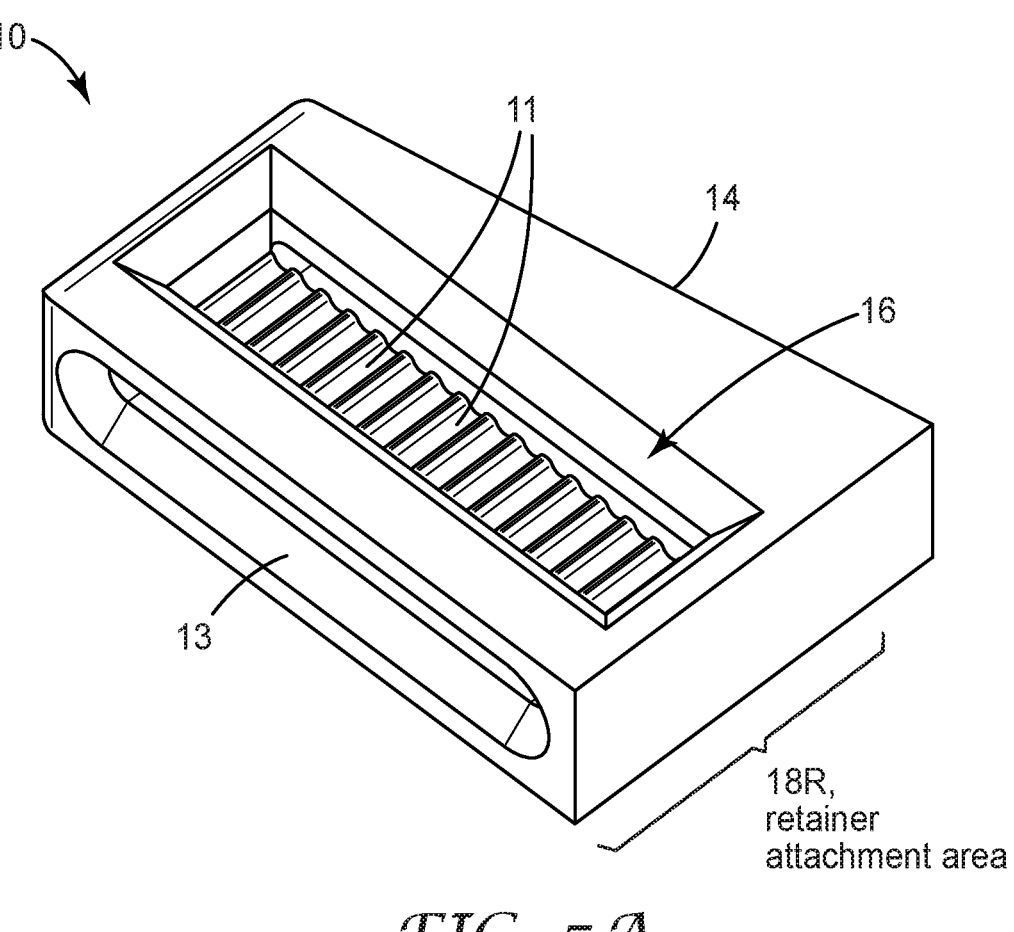
FIGS. 5A and 5B provide views of a cable retainer with grooves for fiber attachment, in accordance with an embodiment of the present description.
Figures 6A, 6B:
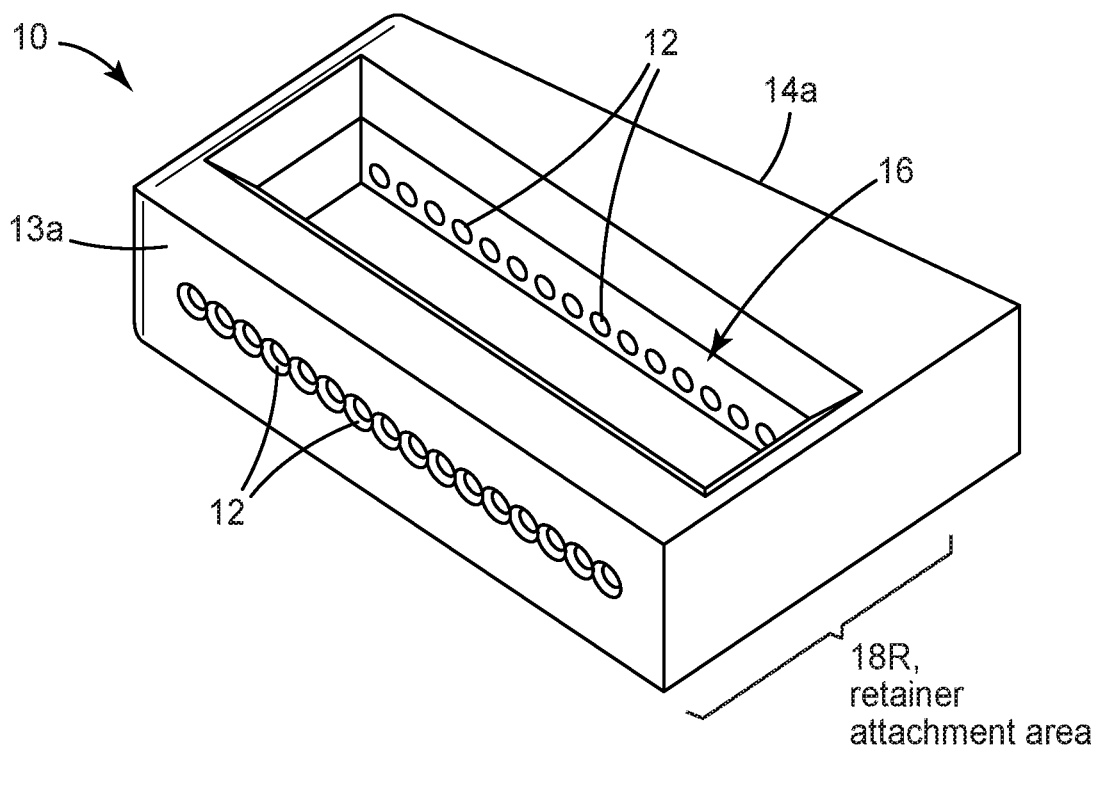
FIGS. 6A and 6B provide views of a cable retainer with holes for fiber attachment, in accordance with an embodiment of the present description.

FIGS. 5A and 5B provide views of a cable retainer with grooves for fiber attachment, and FIGS. 6A and 6B provide views of a cable retainer with holes for fiber attachment, according to the present description. Looking at the embodiment of FIG. 5A, cable retainer 10 includes a retainer attachment area 18R which includes a plurality of substantially-parallel grooves 11 for retaining individual optical waveguides (e.g., optical fibers). In some embodiments, the optical fibers enter in a first open end 13 and extend through cable retainer 10, guided and held in place by grooves 11, to extend out from a second open end 14. In some embodiments, cable retainer 10 includes a window 16 proximate the retainer attachment area 18R through which adhesive may be applied to adhere the optical fibers to grooves 11. In some embodiments, the buffers may be partially stripped from the fibers within the retainer to allow direct application of the adhesive to the fiber cladding (not shown).

FIG. 5B is a front view of cable retainer 10 looking in from the first open end 13, showing grooves 11 in retainer attachment area 18R. As shown in FIG. 5B, the pitch of the retainer, $P_{retainer}$, defined as a center-to-center distance between adjacent fibers (i.e., grooves 11).

FIGS. 6A and 6B show an alternate embodiment of a cable retainer 10 in which the retainer fiber attachment features are a plurality of spaced-apart holes 12. In this case, there are two separate rows of holes 12, each aligned with the other, with the first set of holes 12 starting in cable retainer end 13*a* and the second set of holes 12 passing out through cable retainer end 14*a*. As shown in FIG. 6B, the pitch of the retainer, $P_{retainer}$, in this embodiment is defined as a center-to-center distance between adjacent fibers (i.e., adjacent holes 12). The cable retainer 10 may have a window 16 through which adhesive may be applied to the fibers extending through holes 12.

Figure 7:
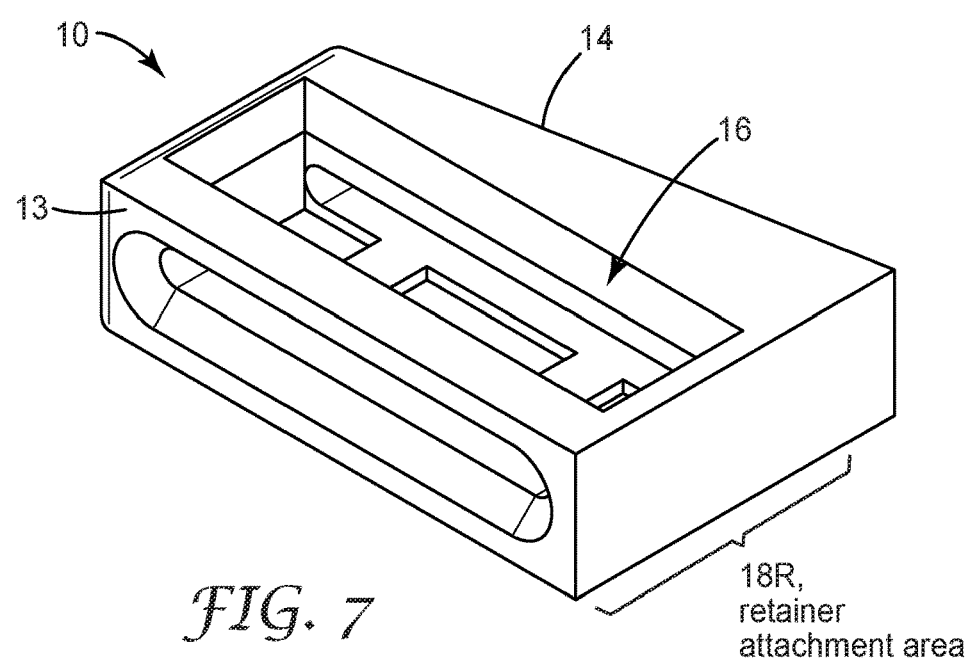
FIG. 7 provides a prospective view of a cable retainer without specific fiber attachment features, in accordance with an embodiment of the present description.

In some embodiments, the cable retainer 10 may not have discrete fiber attachment features (e.g., grooves or holes) but may instead use other means for ensuring the appropriate spacing between the fibers retained. For example, FIG. 7 shows an embodiment of cable retainer 10 which has a first open end 13 and a second open end 14 through which optical fibers may extend, but no individual fiber attachment features within the retainer attachment area 18R. Instead of being held in individual fiber attachment features (e.g., grooves or holes), the fibers may be aligned and held at the desired pitch via an external means, until an adhesive can be used through window 16 to keep the fibers in that pitch.

Figure 8:
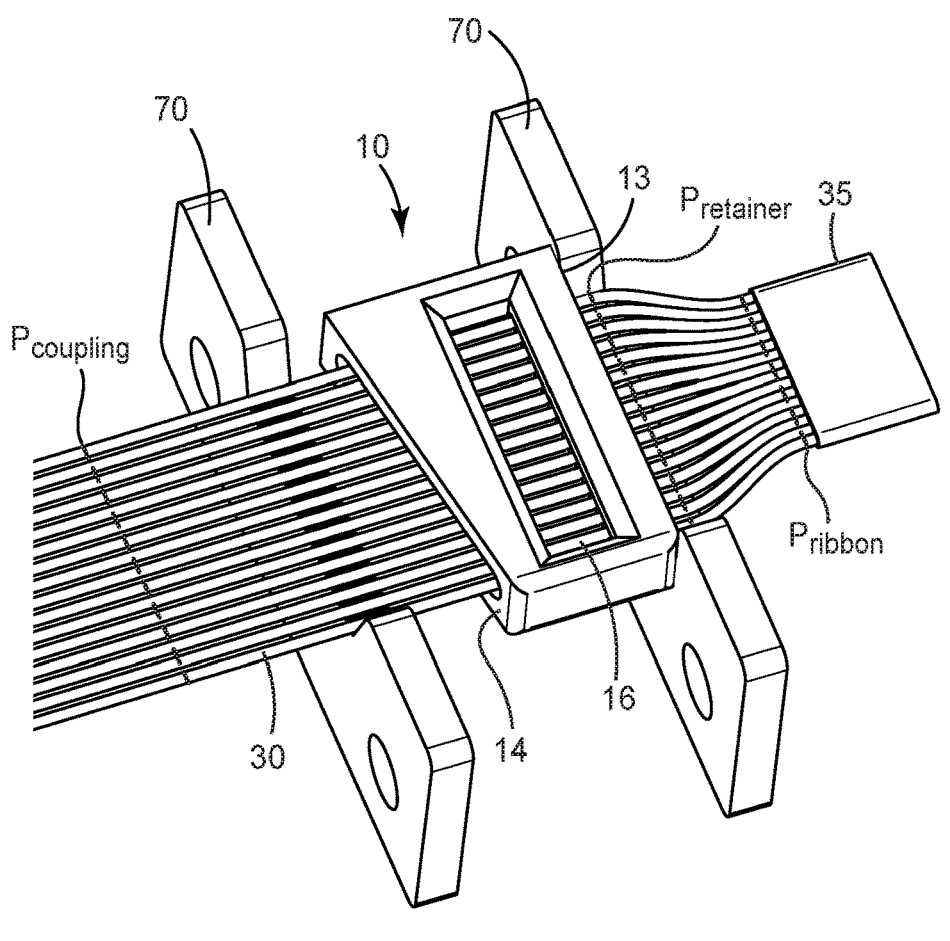
FIG. 8 illustrates how separate, external comb structures may be used to set fiber pitch, in accordance with an embodiment of the present description.

FIG. 8 shows one embodiment of an external means for aligning fibers in the cable retainer 10 embodiment of FIG. 7. In this embodiment, the proper retainer pitch ($P_{retainer}$) is created using external, temporary comb structures 70 on either side of the cable retainer 10 to hold the optical fibers 30 at the appropriate pitch. In the example shown in FIG. 8, fibers leaving a ribbon cable 35 with a smaller pitch $P_{ribbon}$ are fanned out to the appropriate pitch $P_{retainer}$ by one of the comb structures 70 before entering first open end 13 of cable retainer 10. The fibers exiting second open end 14 of cable retainer 10 are then held at an appropriate exit pitch to match the desired pitch for the light coupling unit $P_{coupling}$ (in some embodiments, $P_{coupling}$ may be substantially equal to, or within 5%, or within 10% of $P_{retainer}$). Once the comb structures 70 are holding the optical fibers 30 at the appropriate pitch, adhesive may be applied through window 16. One the adhesive is set, the temporary comb structures 70 may be removed. Cable retainers as described herein may be made from any suitable materials, such as polymers, and by any suitable manufacturing method, such as injection molding or 3D printing.

Figure 9A:
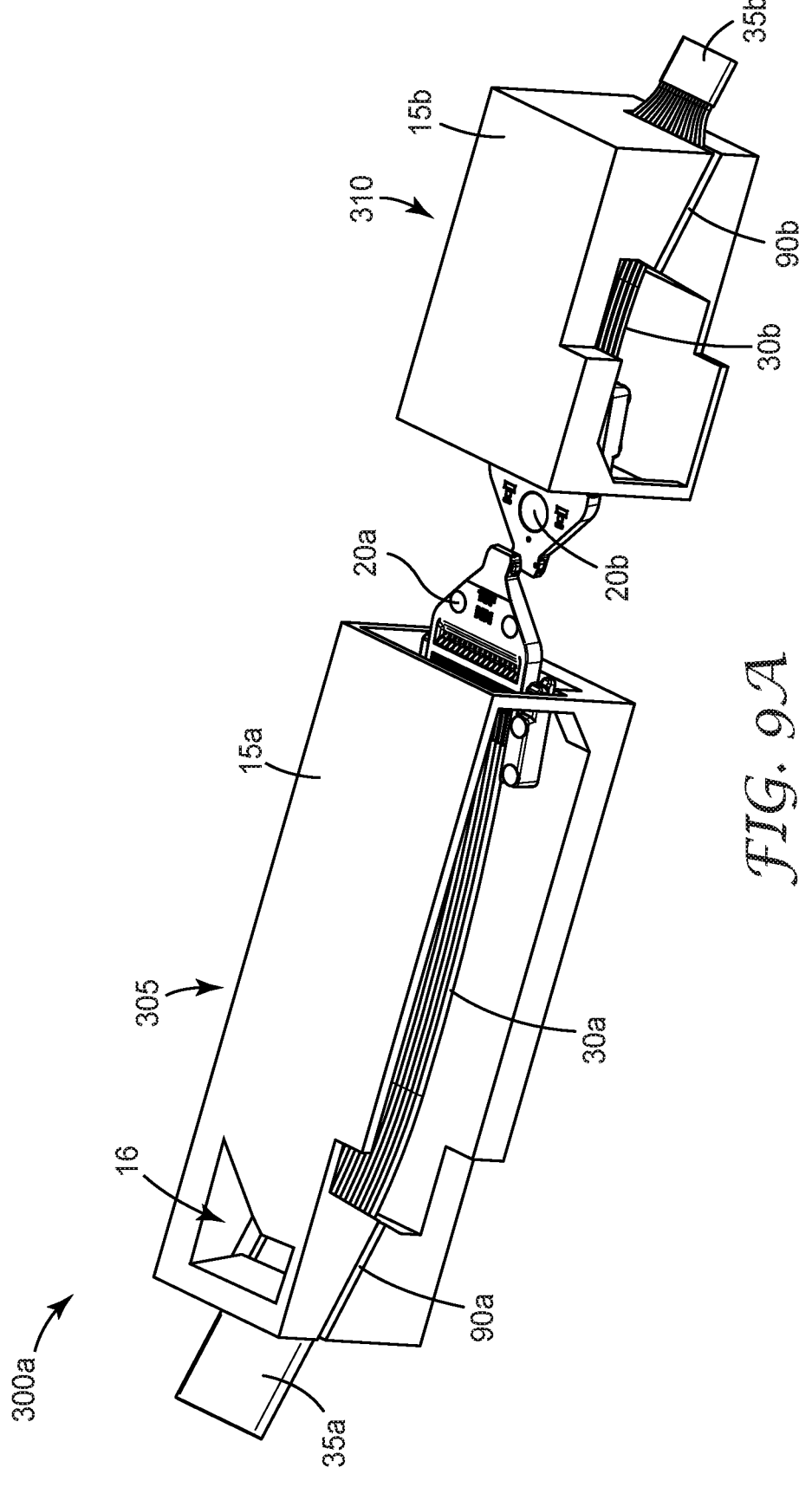
FIGS. 9A and 9B show details of an optical connector assembly without a separate cable retainer, in accordance with an alternate embodiment of the present description.
Figure 9B:
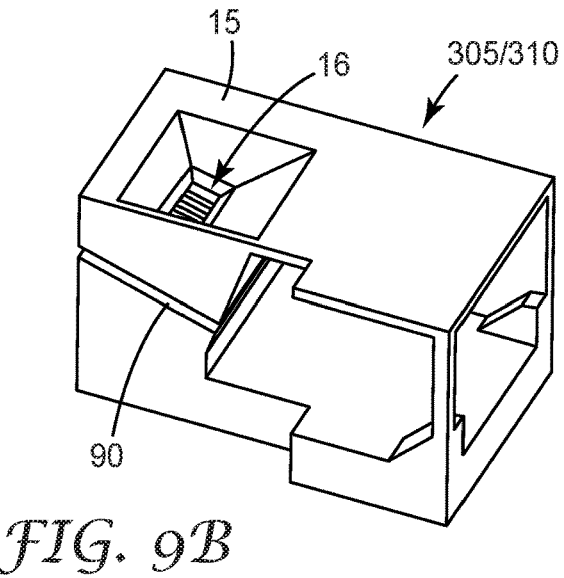

FIGS. 9A and 9B show details of an optical connector assembly 300a without a separate cable retainer, according to the present description. The embodiment of optical connector assembly 300a as shown in FIG. 9A is similar to the embodiment 300 shown in FIG. 1A, except that instead of having a separate cable retainer 10 (such as cable retainers 10a/10b in FIG. 1A), a fiber attachment area 90 (e.g., 90a and 90b in FIG. 9A) is built into each of the connector housing 15a and 15b. In some embodiments, fiber attachment area 90 may include fiber attachment features (e.g., parallel grooves, holes, etc.) similar to those described elsewhere herein for the cable retainer 10. Similar to the function of the cable retainer 10 in other embodiments, fiber attachment area 90 may be configured to retain individual optical waveguides (e.g., optical fibers) at a specified pitch, and is fixed relative to the connector housing 15. As with other embodiments described herein, optical fibers 30 (e.g., 30a and 30b) extend through and are held fixed in place by fiber attachment area 90 at a pitch defined by the light coupling unit 20 (e.g., 20a and 20b). The connector housing 15 may have a window 16 through which adhesive may be applied to the fibers extending through fiber attachment area 90. In some embodiments, the buffers may be partially stripped from the fibers within the attachment area 90 to allow direct application of the adhesive to the fiber cladding (not shown).

The light coupling units 20a and 20b may move and rotate during mating, relative to their respective housings, and optical fiber lengths 30a and 30b may flex or bend as appropriate to allow the rotation during mating. FIG. 9B shows a perspective view of only connector housing 15, which can apply to connector 305 or 310, showing fiber attachment area 90.

Figure 10B:
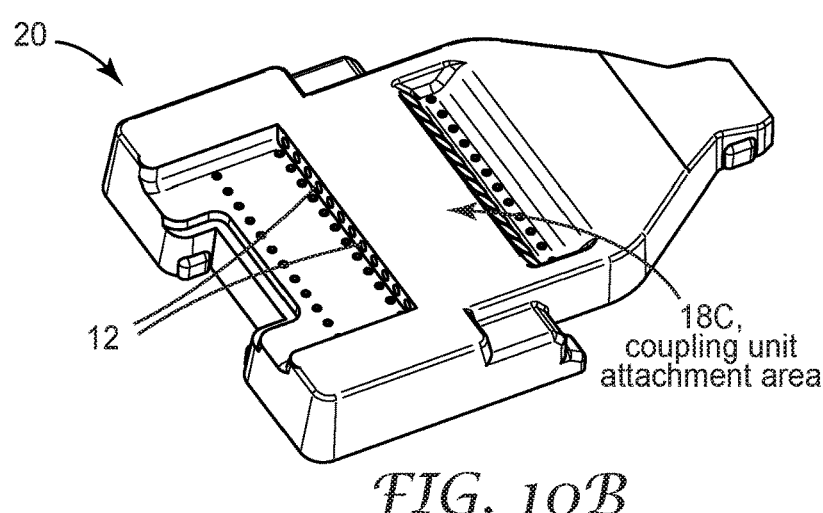

Finally, FIGS. 10A and 10B show details of two different embodiments of light coupling unit 20, according to the present description. FIG. 10A shows an embodiment of light coupling unit 20 where the coupling unit attachment area 18C includes a plurality of substantially parallel grooves 11, each groove 11 holding one of a plurality of optical fibers 30. FIG. 10B shows an alternate embodiment of light coupling unit 20 with a series of spaced-apart holes 12 in the coupling unit attachment area 18C. In both embodiments (FIGS. 10A and 10B), light traveling through optical fibers 30 enters light coupling unit 20 within the coupling unit attachment area 18C, and may then be redirected (e.g., by impinging on an internal mirror surface) into a second direction, allowing the light to enter into a mating light coupling unit 20.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure.

This application is intended to cover any adaptations or variations of the specific embodiments discussed herein. Therefore, it is intended that this disclosure be limited only by the claims and the equivalents thereof.

The invention claimed is:

1. An optical connector assembly, comprising:

a first optical connector, comprising a plurality of first optical fibers having a first nominal fiber cladding diameter, D1, extending between and held by a first attachment area of the first optical connector and a second attachment area of the first optical connector, the first attachment area of the first optical connector and the second attachment area of the first optical connector separated by a distance L1, the plurality of first optical fibers free to bend over the distance L1; and a second optical connector configured to be mated with the first optical connector, comprising a plurality of second optical fibers having a second nominal fiber cladding diameter, D2, different from D1 by at least 10% extending between and held by a first attachment area of the second optical connector and a second attachment area of the second optical connector, the first attachment area of the second optical connector and the second attachment area of the second optical connector separated by a distance L2 different than L1, the plurality of second optical fibers free to bend over the distance L2;

wherein a ratio of L1/L2 is within 5% of $(D1/D2)^2$.

2. The optical connector assembly of claim 1, wherein the plurality of first optical fibers and the plurality of second optical fibers each bend when the first optical connector is mated with the second optical connector.

* * * * *